US007052616B2

(12) United States Patent
Fonash et al.

(10) Patent No.: US 7,052,616 B2
(45) Date of Patent: May 30, 2006

(54) FABRICATION OF MOLECULAR SCALE DEVICES USING FLUIDIC ASSEMBLY

(75) Inventors: Stephen J. Fonash, State College, PA (US); Daniel J. Hayes, State College, PA (US); Wook Jun Nam, State College, PA (US); Joseph Cuiffi, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 628 days.

(21) Appl. No.: 10/219,955

(22) Filed: Aug. 14, 2002

(65) Prior Publication Data

US 2003/0040173 A1 Feb. 27, 2003

Related U.S. Application Data

(60) Provisional application No. 60/369,259, filed on Mar. 26, 2002, provisional application No. 60/336,986, filed on Nov. 9, 2001, provisional application No. 60/312,136, filed on Aug. 14, 2001.

(51) Int. Cl.
  *C23F 1/00* (2006.01)
(52) U.S. Cl. ............................................. 216/2
(58) Field of Classification Search .................. 216/2
  See application file for complete search history.

(56) References Cited

U.S. PATENT DOCUMENTS

| 5,275,851 | A | | 1/1994 | Fonash et al. ............... 427/578 |
| 5,277,068 | A | * | 1/1994 | Fukiura et al. ............... 73/724 |
| 5,587,128 | A | | 12/1996 | Wilding et al. ............... 422/50 |
| 6,013,565 | A | | 1/2000 | Fonash et al. ............... 438/478 |
| 6,034,414 | A | * | 3/2000 | Lin ............................. 257/600 |
| 6,074,725 | A | | 6/2000 | Kennedy ...................... 428/188 |
| 6,136,212 | A | | 10/2000 | Mastrangelo et al. ......... 216/49 |
| 6,180,536 | B1 | | 1/2001 | Chong et al. ............... 438/745 |
| 6,239,451 | B1 | | 5/2001 | Fonash et al. ................ 257/53 |

OTHER PUBLICATIONS

International Search Report for PCT Application Ser. No. PCT/US02/26009, Filed Aug. 14, 2002.

* cited by examiner

*Primary Examiner*—Jill Warden
*Assistant Examiner*—Paul Hyun
(74) *Attorney, Agent, or Firm*—Burns & Levinson LLP; Orlando Lopez; Peter J. Borghetti

(57) ABSTRACT

There is disclosed a method providing micro-scale devices, nano-scale devices, or devices having both nano-scale and micro-scale features. The method of the invention comprises fluidic assembly and various novel devices produced thereby. A variety of nanofluidic and molecular electronic type devices and structures having applications such as filtering and genetic sequencing are provided by the invention.

30 Claims, 12 Drawing Sheets

FABRICATION OF MOLECULAR SCALE DEVICES USING FLUIDIC ASSEMBLY

This application claims priority from U.S. Provisional Application No. 60/312,136 filed Aug. 14, 2001; U.S. Provisional Application No. 60/336,986, filed Nov. 9, 2001; and U.S. Provisional Application No.60/369,259, filed Mar. 26, 2002.

BACKGROUND OF THE INVENTION

1. Field of the Invention

The present invention relates to a method of fabricating nano-scale or molecular scale devices using fluidic assembly and novel devices produced thereby. More particularly, the present invention relates to a novel production method for electrical and dielectrical devices. Also, the invention relates to the production of fluidic structures which may be on the nano-scale, as desired. The invention further relates to the use of such structures in nano-particle and molecular scale applications such as sorters, filters, molecular electronics, sensors, and "molecular readers".

2. Description of the Prior Art

Molecular scale electrical and dielectric devices normally consist of molecules contacted by a metal electrode and an electrolyte or by two metal electrodes. Generally the molecules are positioned using a self-assembling monolayer or monolayers (SAM) approach. These molecular-scale devices have attracted a great deal of interest because of their potentially wide impact on numerous technologies in applications such as micro diodes, micro switches, micro wires, and micro electric/dielectric and electrochemical sensors.

In such devices, the characteristics of the molecules selected are very important because the intent is to have the molecules determine the function of the device. For example, the molecule 4-thioacetylbiphenyl can form a SAM that can be used as a molecular wire by transporting electrons through the layer under certain conditions. In another example of a molecular device made using SAMs, a molecular switch has been demonstrated in which the bipyridinium molecule switches its conductivity on and off by changing its oxidation state. Devices using positioned, contacted molecules have additional potential in biotechnological applications. For example, it has been shown that SAM devices can detect certain target DNA, RNA, and proteins by hybridization, and can identify certain diseases and infections through determining specific DNA sequences. There have been a number of fabrication approaches for these devices, but most of the techniques are complex and non-manufacturable.

The growing demand for structures and detectors on the nano-particle and molecular scale has prompted considerable research by the nanofabrication community into the development of nanoscale gaps and pores. These nanoscale structures and devices are being proposed for use in applications such as molecular electronics, nucleic acid sequencing, the driving of unique chemical reactions, molecular filtration, chemical and electro-chemical sensing, and single molecule detection. A popular method of nanopore formation, which is being explored, is ion beam bombardment of micron, sub-micron, or nano-scale holes into molecular-scale pores (Li J, et al. Nature, 412 (6843):166–169 Jul. 12, 2001). In this approach, the starting holes are usually fabricated using standard photolithography. However, the problems associated with ion bombardment fabrication and dimensional control can be challenging to overcome. This is an immense problem when attempting to use this approach to produce high yield, low cost, manufacturable nano-scale structures for these applications on inexpensive substrates such as glasses, plastics or metal foils. In addition, approaches such as this create a pore, which in itself, does not perform the electrical or electrochemical biasing or monitoring. This functioning must be added. Other groups have produced channel structures for sorting and detection [J. Han and H. G. Craighead, Science 288: 1026(2000).] but these (1) lack the unique process flow and materials approach of this invention, attributes which lead to a manufacturable product, (2) lack attaining the nano-scale feature sizes disclosed here, (3) lack the precise gap (pore) spacing available with our approach, or (4) lack all these features.

In the present invention, the gap or pore can be defined by a material or materials which will allow self-assembly, allow chemical assembly, surface chemistry directed assembly, allow electric field guided assembly, allow steric assembly, or allow all of these. This allows controlled positioning of molecules or nano-particles in applications. It also allows valving materials to be positioned in the gap and to be controlled by gap electric fields, thermal changes, pH changes, and chemical changes when and if desired. The gap (pore) spacing can be directly fabricated with our approach to be a small as 1 nm. With our unique use of self-assembly, electro-less deposition, electrochemical plating, etching or electrochemical etching the gap spacing can be controllably further reduced or increased, as required.

One of the most challenging aspects of micro and nanofluidic design, fabrication and use is the control of fluid movement in complex devices. In this invention, the inventors describe a novel method for nano and microfluidic valve fabrication using polar, inducibly polar or liquid crystal molecules constrained within nano or microscale devices.

Accordingly, it is an object of the present invention to provide a new and improved method of producing fluidic, electrical or dielectrical devices on the molecular-scale or nano-scale.

Another object of the present invention is to provide molecular-scale or nano-scale devices which make use of fluidic assembly during fabrication or use.

SUMMARY OF THE INVENTION

The present invention is directed to a novel molecular-scale device fabrication method. The present invention enables the fabrication of nanometer scale nano-particle or molecular positioning/contacting electrode gap structures with (1) controllable sacrificial layer depositing and etching, (2) electrode formation without any chance of molecule or nano-particle damage, (3) tailorable electrode spacing at each electrode gap site, (4) ease of changing the electrode type between the two electrodes at a gap site or among electrodes at different electrode sites in an array, (5) flexibility in nano-particle or molecular positioning in gap regions using self-assembly, field assisted positioning, and steric positioning, (6) ease of electrical or electrochemical interrogation of each nano-particle or molecular pore (gap), and (7) ease of changing the molecule type in a nano-gap or pore. These points allow the creation of an array of positioning/contacting (gap) structures that can have different molecules, such as may be desired in sensor structures, at different gap sites. The nano-particles or molecules positioned and contacted at our gap structure sites are easily addressed and easily changed and varied from site to site because the molecules are positioned after electrode structure formation. Convenient molecule change also allows, for example, using the same basic process flow and molecular device configuration in many different device applications such as molecular wires, molecular switches, chemical sensors, bio-sensors, nucleic acid detector, hybridization detector, chemical reactor, gas sensor, and even electrochemical biosensors by simply changing the molecule or molecules being positioned and contacted. The fact that our positioning/contacting structure formation occurs before molecule insertion leads to all this versatility and to the avoidance of damage. Our ease of molecule or nano-particle insertion at gaps also allows valving materials to be positioned in the gap and to be controlled by gap electric fields, thermal changes, pH changes, and chemical changes when and if desired.

In addition, the method of the present invention provides both the simultaneous construction of micro-sized features and molecular scale features in the same structure, if desired. Consequently our method makes it easy to integrate molecular scale devices into microfluidic or nanofluidic channel structures, as necessary. The nano-scale gap height spacing features of this invention are attained without the need of sophisticated lithography. We have demonstrated that the gap (pore) spacing that can be directly fabricated with our approach can be at least as small as 20 nm, and is only limited by the means of sacrificial layer deposition. With self-assembly, electro-less deposition, or electrochemical plating, etching or electrochemical etching the gap spacing can be controllably further reduced or increased. Our approach allows the fabrication of both micro- and nano-scale features, if desired, in the same system. It allows nano-scale features within in microfluidic systems without high cost lithography. This feature opens the door to very high throughput, and low cost manufacturing. If the lateral dimension of the gap is also to be on the nano-scale, approaches such as e-beam lithography, photon lithography, self-assembly, or embossing lithography may be employed.

Also, the present invention comprises the use of porous columnar thin film material for manipulating and sensing molecular scale chemical and biological compounds. Nano-scale columnar/void material is described in U.S. Pat. No. 6,399,177. The material is preferably a deposited nanoscale porous silicon thin film and can be used to define the pore size in the gap. A variety of nanofluidic and molecular electronic type devices and structures for applications such as filtering and genetic sequencing are enabled by the invention.

The present invention discloses a method for producing a device comprising: patterning a first structural material; removing regions of the first structural layer to produce a first patterned structural layer; depositing first sacrificial material onto regions of said first patterned structural layer where first structural material has been removed to produce a first sacrificial layer; patterning (lithography); depositing electrode material onto the surface of first structural material of the first patterned layer to produce a first electrode; patterning (lithography); depositing second sacrificial material to produce a second sacrificial layer on the electrode and first sacrificial layer region on said first patterned layer; depositing cap of channel material to produce a channel cap layer; depositing capping material onto said channel cap layer to produce a capping layer; removing said first sacrificial layer and said second sacrificial layer to produce a device having a gap region between said electrode resulting from the removal of the portion of said second sacrificial layer between said cap of channel layer and said first electrode and a fluid control channel continuous with said gap region resulting from the removal of the remaining portion of said second sacrificial layer and said first sacrificial layer. The method of the invention further comprising the steps of: patterning the channel cap layer to produce a patterned channel cap layer; and depositing electrode material in the region where channel gap material of said channel gap layer has been removed by patterning to produce a second electrode.

The method of the invention may further comprise the step of etching at least one hole through the capping layer and the channel cap layer, and first depositing the first structural layer on a substrate. The substrate is preferably selected form the group consisting of semiconductors, glasses, plastics, polymers, metals, ceramics, insulators, organic materials, inorganic materials, and any combinations thereof.

The present invention discloses a device comprising: a substrate, a gap or pore region less than 1 um defined by an upper and lower wall, a capping layer; at least one hole through said capping layer; and at least one molecule positioned in said gap region.

Also, the presest invention discloses a device prepared by a method comprising depositing a sacrificial layer; depositing one or more layers above the sacrificial layer; and removing the sacrificial layer creating a nano-gap or pore. The sacrificial layer may be deposited on a substrate.

As used in the present invention, the term "pore" means any tiny hole admitting fluid or molecules.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, preferred methods and materials are described below. All publications, patent applications and other references mentioned herein are incorporated by reference in their entirety. In the case of conflict, the present specification, including definitions, will control. In addition, the materials, methods, and examples are illustrative only and not intended to be limiting.

Other features and advantages of the present invention will be apparent from the following detailed description, and from the claims.

BRIEF DESCRIPTION OF THE DRAWINGS

FIG. 4(*b*) is a cross section of a micro-channel structure of the invention.

FIG. 5(*b*) is an blown up image of a nano-channel of the invention.

DETAILED DESCRIPTION OF THE INVENTION

Figure 1A:
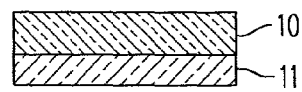
FIG. 1 is schematic drawing of the process steps for fabrication of a device embodiment of the invention.

Referring now to FIG. 1, there is shown a schematic representation of the process steps for the fabrication of a device embodiment of the invention. Shown is first structural layer 10, substrate 11, first sacrificial layer 12, base layer 13, bottom electrode (lower layer of nano-gap or pore) 14, second structural layer 15, second sacrificial layer 16, cap of channel or insulator layer 17, top electrode (upper layer of nano-gap or pore) 18, capping layer 19, positioning/contacting gap structure 20, molecules 21 moved to gap structure, through-hole 23, and fluidic channel 22. In step (a.) the first structural layer is deposited. Step (b.) is lithography, etching, high surface to volume ratio material (e.g., column/void network film) deposition, and lift-off. Step (c) is base layer deposition. Step (d.) is lithography, bottom electrode material deposition (e.g., gold) and lift-off. Step (e.) is second structural layer deposition (e.t., silicon oxide). Step (f.) is lithography, the second structural layer etching, coltrollable sacrificial layer deposition (e.g., aluminum), and lift-off. Step (g.) is cap-of-channel or insulator layer deposition (e.g., silicon nitride). Step (h) is lithography, insulator or cap of channel layer etching, top electrode material layer deposition (e.g., gold) and lift off. Step (i.) is capping layer deposition (e.g/, silicon oxide), lithography, through hole etching, and sacrificial layer etching. Step (j.) is molecules moved to gap structure through fluidic channel and positioned/contacted.

Figure 2:
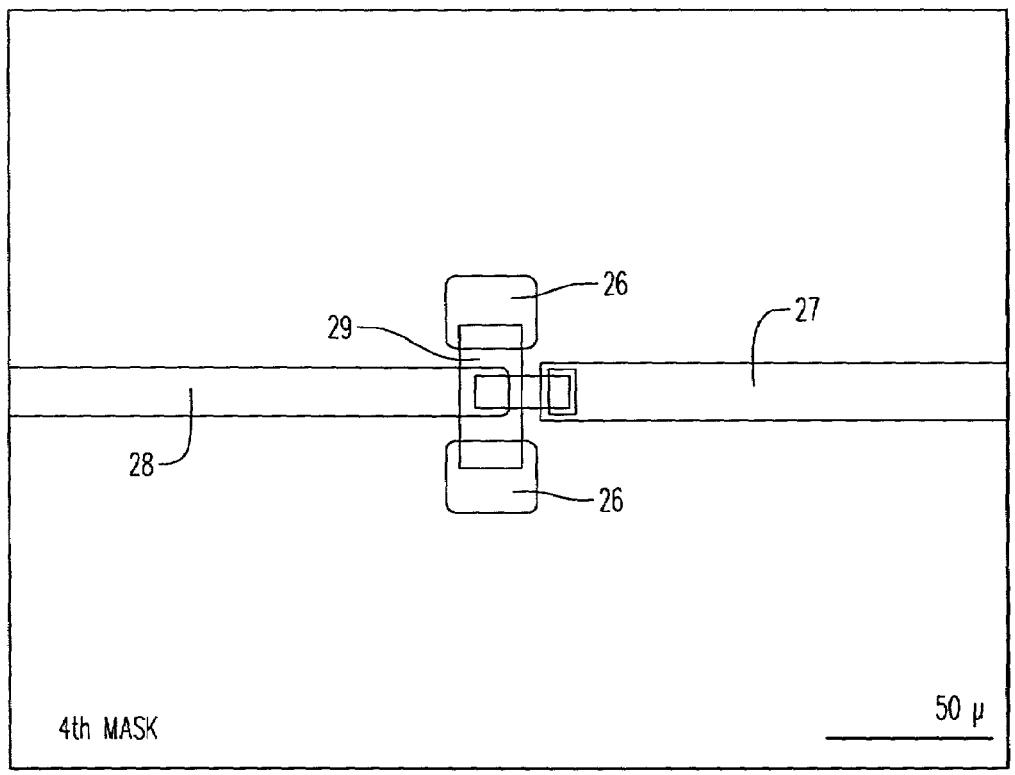
FIG. 2 is top view of a device of the invention having a molecular-scale gap channel structure and two electrodes.
Figure 3A:
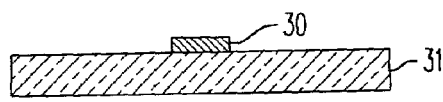
FIG. 3 is a schematic drawing of the process steps for fabrication of a fluidic device embodiment of the invention with micro-scale and nano-scale features and a nano-scale molecular pore.
Figure 3B:
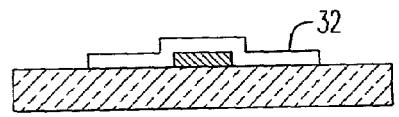
Figure 3C:
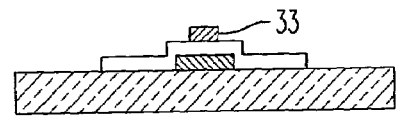
Figure 3D:
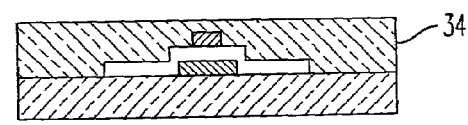
Figure 3E:
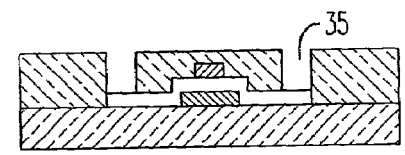
Figure 3F:
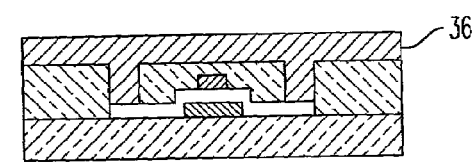
Figure 3G:
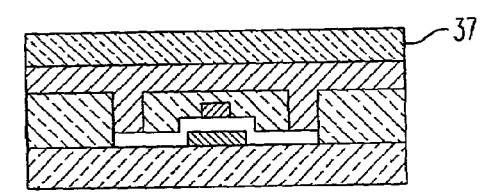
Figure 3H:
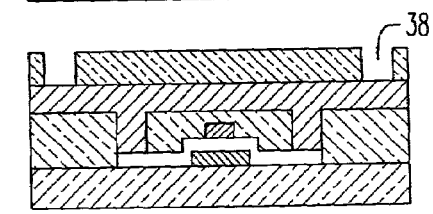
Figure 3I:
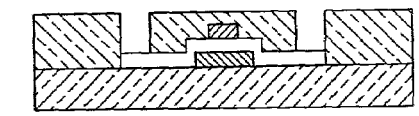
Figure 3J:
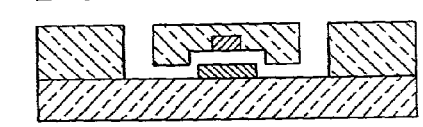

Referring now to FIG. 2, shown is bottom electrode 28, molecular-scale gap channel structure 29, entrances for SAM 26, and top electrode 27.

FIG. 3 shows first electrode (lower layer of nano-gap or pore) 30, substrate 31, first sacrificial layer 32, second electrode (upper layer of nano-gap or pore) 33, first capping layer 34, through-hole 35, second sacrificial layer 36, second capping layer 37, and through-hole 38. Step (a.) is first electrode patterning, deposition and lift-off. Step (b) is first (precision)sacrificial layer patterning, deposition, and lift-off. Step (c.) is second electrode patterning, deposition, and lift-off. Step (d.) is first capping layer deposition. Step (e.) is etching of through-hole for the first sacrificial layer patterning and removal. Step (f.) is second sacrificial layer deposition. Step (g) is second capping layer deposition. Step (h.) is etching through-hole for the second sacrificial layer patterning and etching. Step (i.) is second sacrificial layer removal, and step (j.) is first (precision) sacrificial layer removal.

Figure 4A:
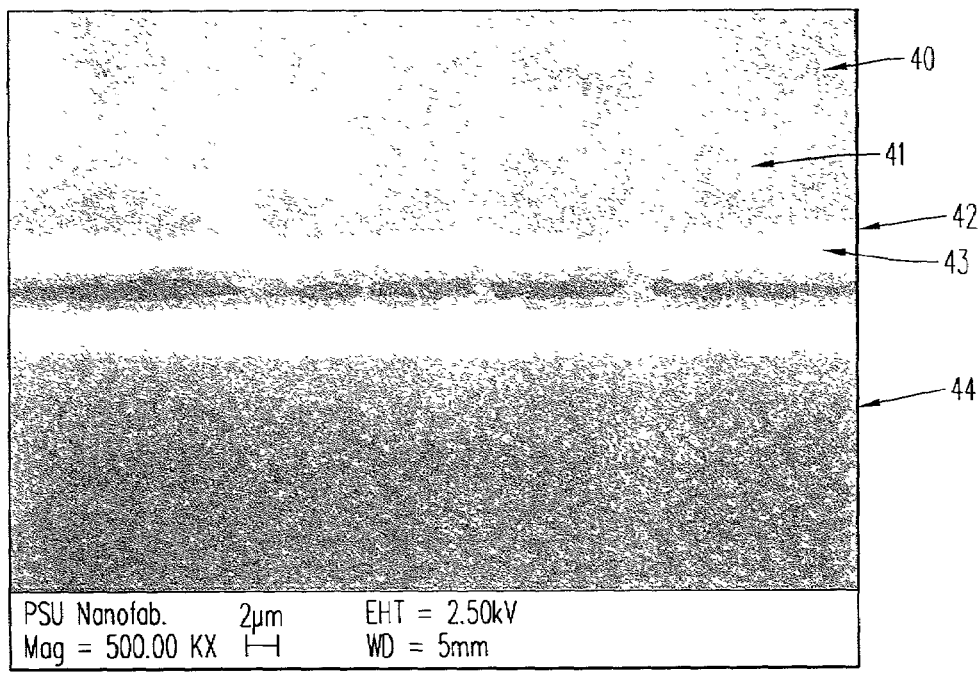
FIG. 4(*a*) is a cross section of a nano-channel structure of the invention.
Figure 4B:
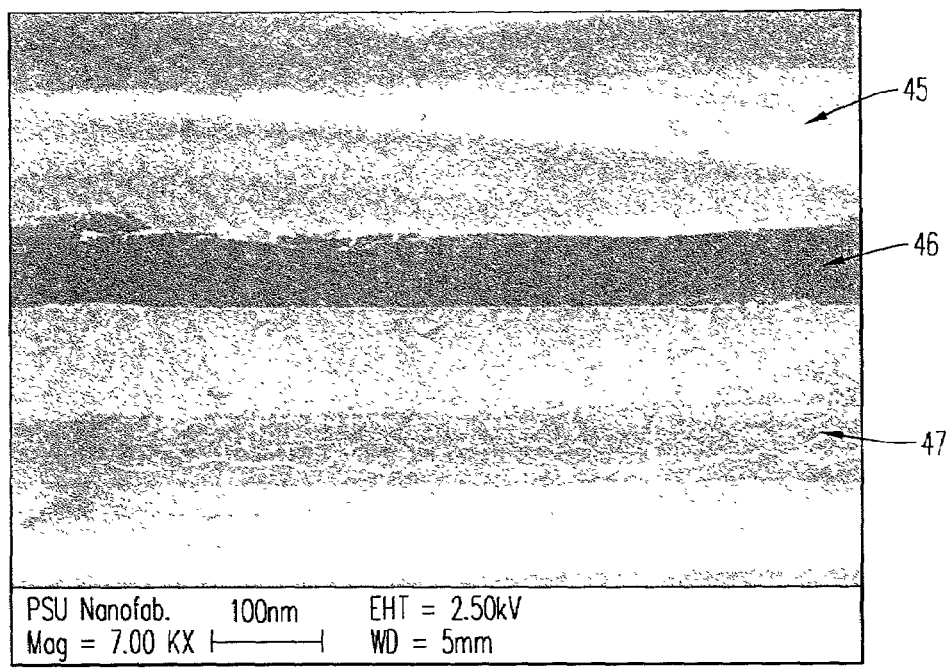

Referring now to FIG. 4(a), shown is first capping layer 40, second electrode 41, 30 nm nano-channel 42, first electrode 43, and substrate 44. Shown in FIG. 4(b) is second capping layer 45, 2.7 µm micro-channel 46, and first capping layer 47.

Figure 5A:
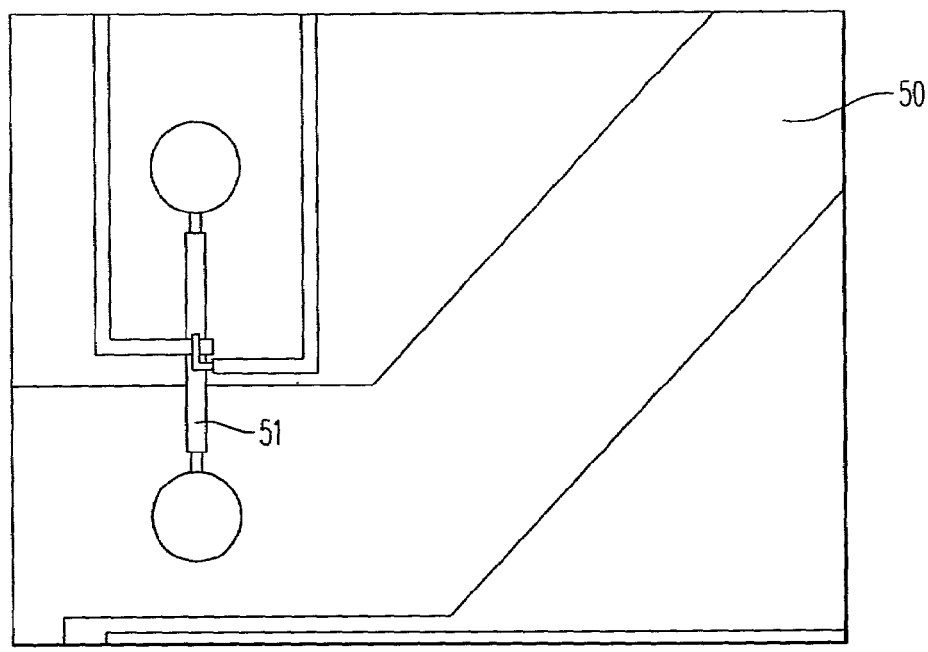
FIG. 5(*a*) is an image of a nano-channel structure of the invention integrated with a micro-channel.
Figure 5B:
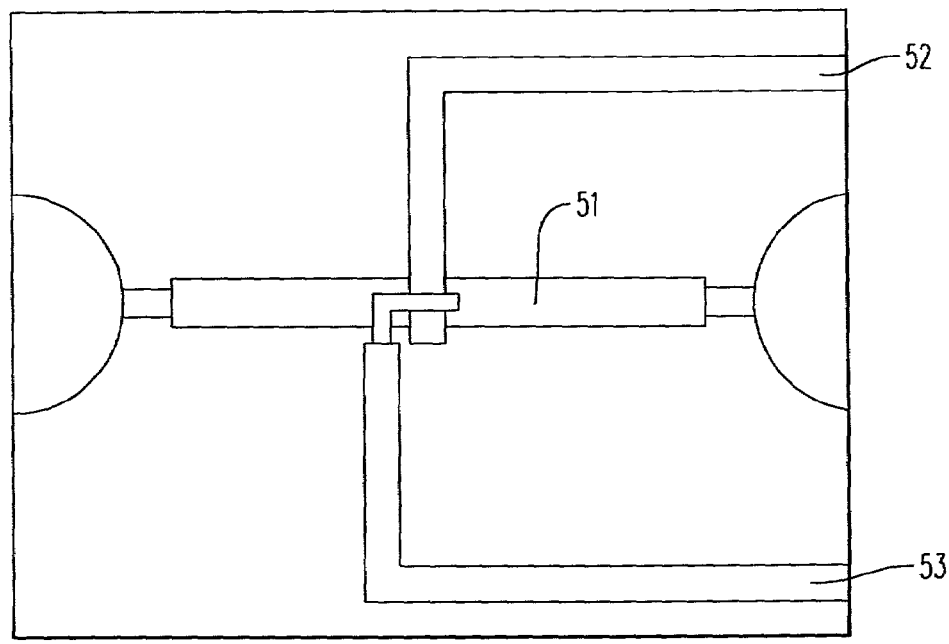

Referring to FIG. 5(a), shown is 2.7 µm micro-channel 50, 30 nm nano-channel 51, and in FIG. 5(b) shown is first electrode 52, second electrode 53, and 30 nm micro-channel 51.

Figure 6:
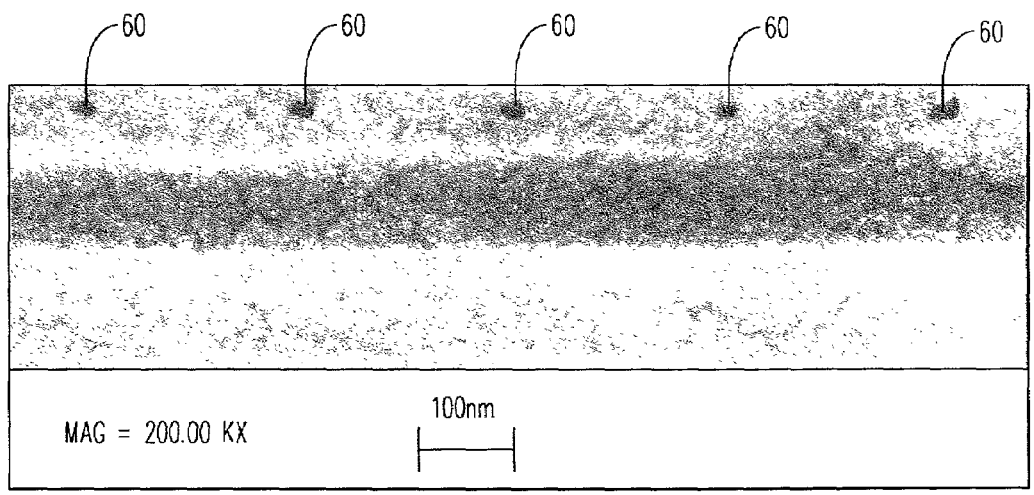
FIG. 6 is a cross section image of a nano-channel region of a device of the invention.

In FIG. 6, the nano-channel cross-section (200KX) is cut to observe by SEM the nano-channel (texture seen is caused by fold used for imaging). The channel is 20 nm high, 20 nm wide, 200 nm spacing; nano channels are buried in a transparent capping layer. Shown is nano channel 60.

Figure 9A:
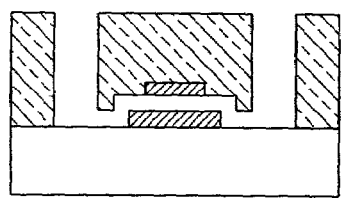
FIG. 9 is a device of the invention fabricated with the sacrificial layer method showing a cross-sectional view and a top perspective view and an array.
Figure 9B:
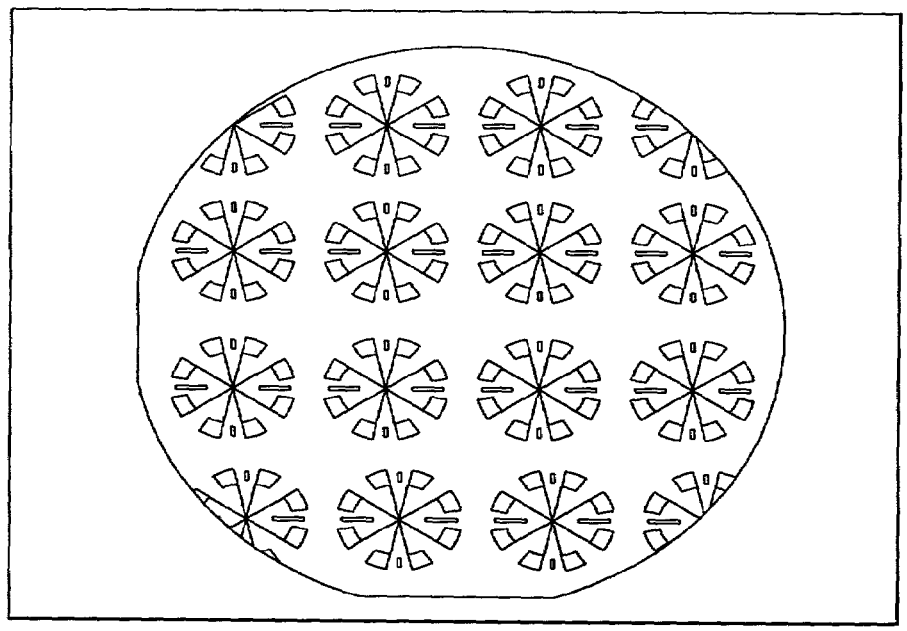
Figure 9C:
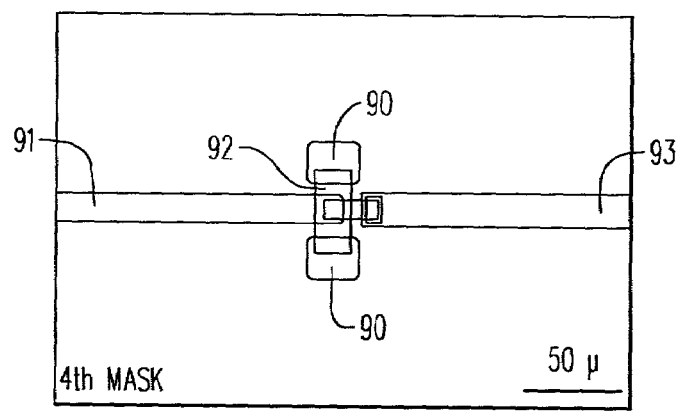
Figure 10:
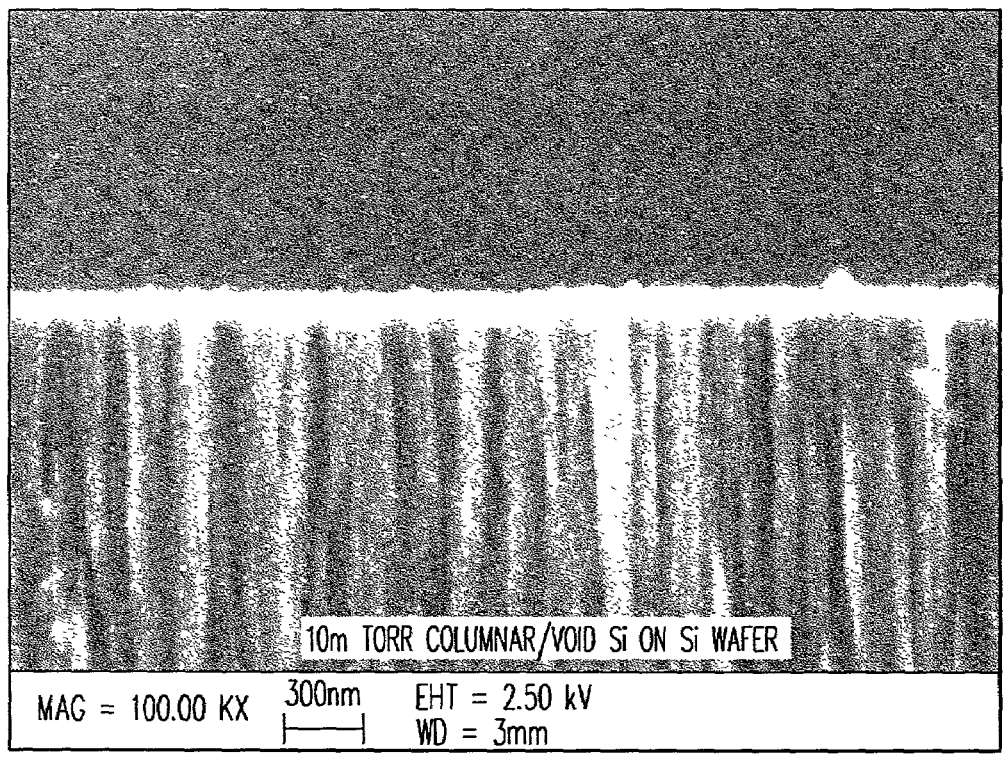
FIG. 10 is a SEM of deposited columnar/void silicon thin film on a silicon wafer.

FIG. 9 shows a device embodiment of the invention. FIG. 9(a) is a cross-sectional view, FIG. 9(c) is a top view, and FIG. 9(b) is an array. Shown is entrances for SAM 90, bottom electrode 91, molecular scale gap channel 92, and top electrode 93.

Figure 11:
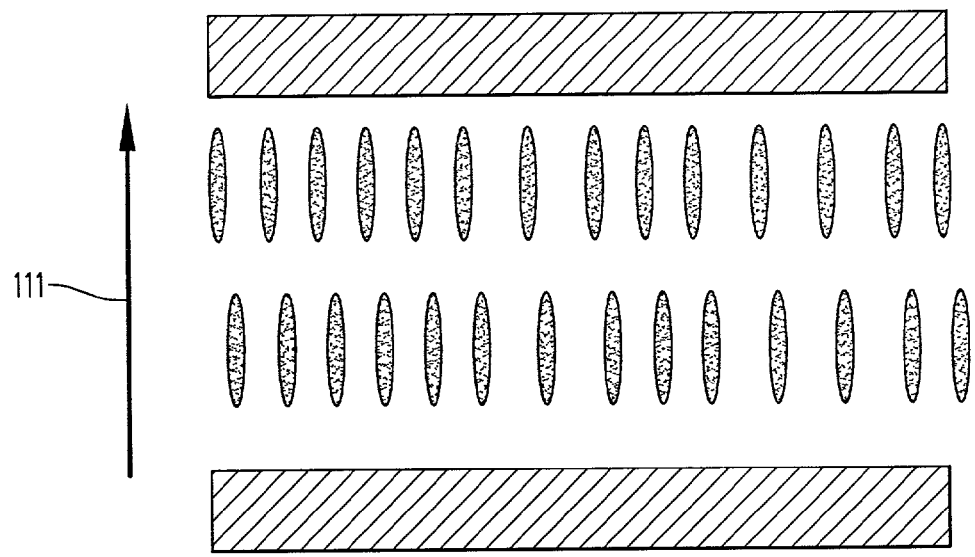
FIG. 11 is a diagramatic illustration of molecular alignment along a single common axis designated as the director.
Figure 12:
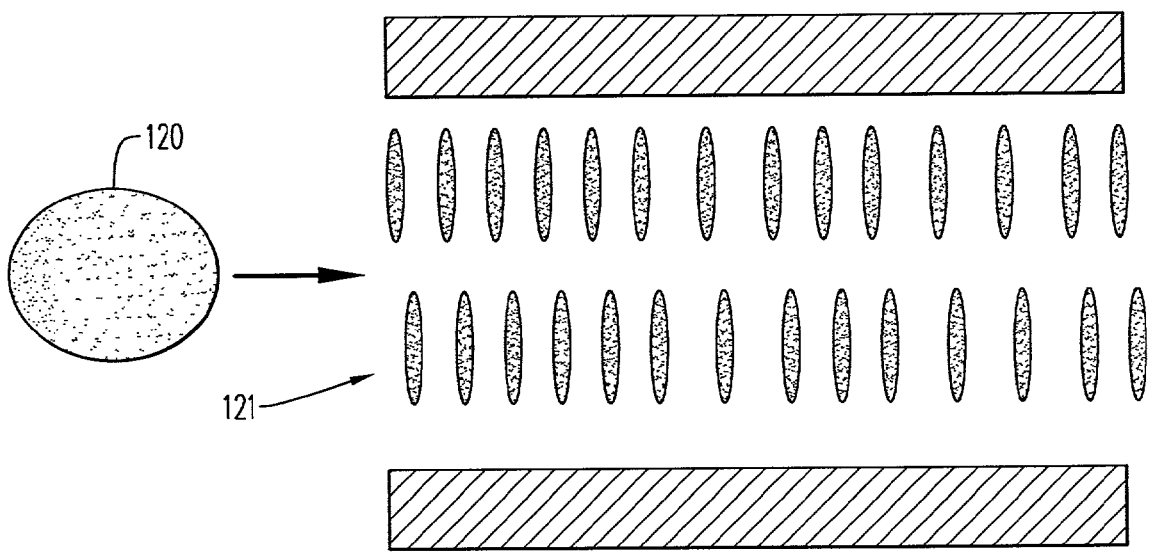
FIG. 12 is an illustration of aligned molecules resisting the flow of a globular protein.

Referring to FIG. 11, shown is director 111. In the illustration of FIG. 12, shown is globular protein 120 and aligned molecules 121 resisting the flow of the globular protein.

Figure 13:
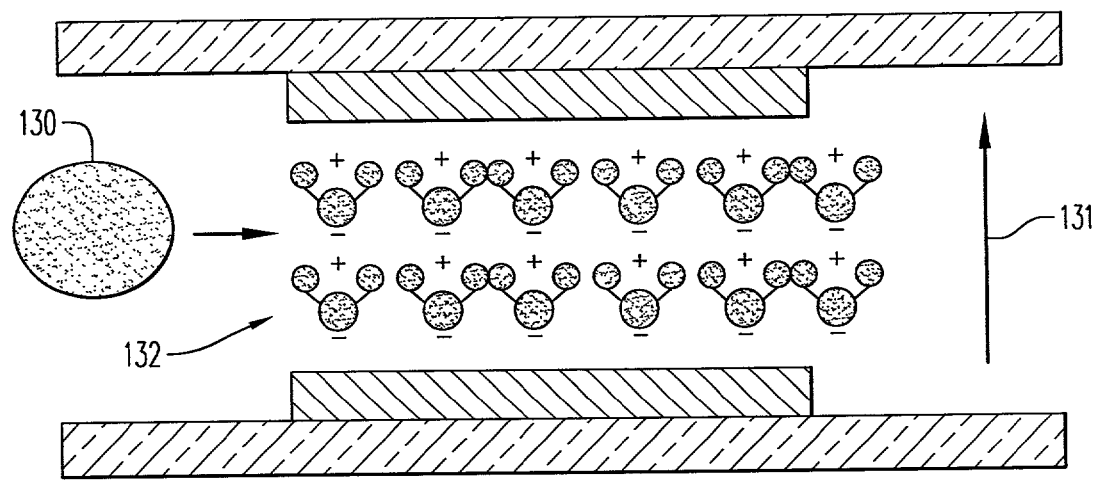
FIG. 13 is an illustration of water molecules in a nanogap aligned with an electric field resisting protein movement.

Referring now to FIG. 13, shown is globular protein 130, electric field 131, and water molecules 132 in a nanogap aligned with an electric field resisting protein movement.

Figure 1B:
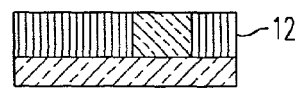
Figure 1C:
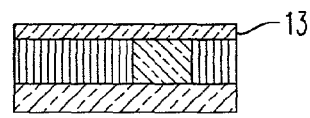
Figure 1D:
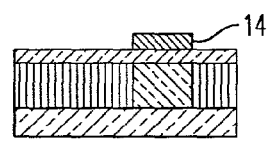
Figure 1E:
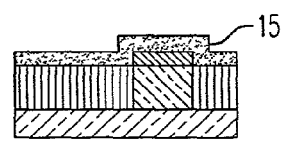
Figure 1F:
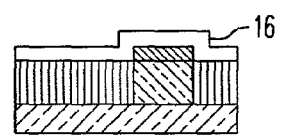
Figure 1G:
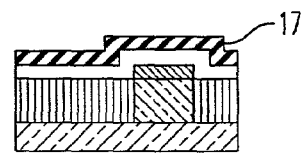
Figure 1H:
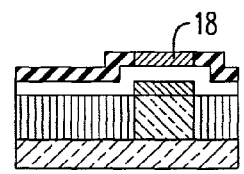
Figure 1I:
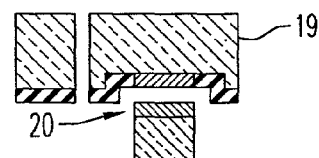
Figure 1J:
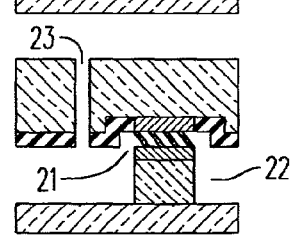

Using controllable sacrificial layers, nanometer scale positioning/contacting gap structures, such as that shown in FIG. 1i, can be fabricated. By electroplating and electroless plating from appropriately chosen solutions inserted into a given gap by selected flow through micro- or nanoscale access channels, the composition and spacing of the electrodes needed in the contacting function of the gap sites can be precisely adjusted by biasing either or both electrodes, if desired. These different plating solutions for the electrodes, when used, can be brought to the gap region by micro- or nanofluidics channels such as seen in FIG. 2. This precise tailoring capability allows different molecules to be accommodated by simply modifying the same basic structure. Furthermore, this precise tailoring capability available at each site also means the different sites in an array can be individually tailored for specific molecules The presence of the micro- and/or nanofluidic channel access to each positioning/contacting gap site allows different molecules to be brought into different positioning/contacting gap sites, as desired. At these sites, these molecules may immobilized by chemical or physical (e.g., electric field or steric) means. This latter methodology is available in our approach since the electrode spacing at each site is tailorable. In addition these attached molecules or nano-particles themselves may be used to adjust gap spacing, as desired. Positioned molecules or nano-particles in certain selected gaps may also be arranged to serve as valves wherein valve activation is provide by gap electric and magnetic field variation, thermal changes, pH changes, and chemical changes.

All of this versatility provided by our approach allows using the same basic site configuration or site array configurations in very different device or device array applications such as molecular wires, molecular switches, sorting, and electrical or electrochemical chemical and bio-medical sensors and detectors, nucleic acid detector, hybridization detector, protein-protein interaction sensor, antibody-antigen sensor, drug target validation sensor, chemical reactors, gas detectors, catalytic reactors.

The invention described here presents the methodology for constructing these fine-control positioning/contacting structures. It also discusses the sample applications of such structures. More specifically the possibility of micro- and/or nano-scale fluid channel access to unique, tailorable nanometer scale positioning/contacting gap structures (e.g. FIG. 1) allows the movement of plating molecule solutions and reactants, and in the case of sensors, analyte solutions to specific gap sites in an array, when desired. In sensor applications, this device or device array can be used to interrogate nano-particles, molecules and atoms that enter, pass through, leave, and/or react with its active gap area (area between top and bottom electrodes). Access to this device can be from a variety of fluid or gaseous delivery systems including micro fluidic device and array device setups or any number of macro, micro, or nano-scale systems. In the case of macro, micro or nano-scale arrays, nano-particle or molecular systems can be positioned at various gap sites by exposing the electrodes, through the fluidic channel access, to a solution or gas/vapor containing species for gap modification.

Electrical access to each positioning/contacting nano-gap (FIG. 1.$i$) is from the top and bottom electrodes, and this configuration allows for a variety of electro-chemical and electrical measurements to be made of species in the gap including conductivity (transient, AC and DC), capacitance, and power loss, as functions of voltage, current, frequency etc. For example, with a specific SAM positioning technique using the electrode material, the molecule 4-thioacetylbiphenyl and bipyridinium can be positioned and thereby electrically contacted at each positioning/contacting nano-gap site. As a result, this electrode configuration can be easily employed as active molecular electronic device and can be configured in a molecular electronics array. In addition, because the electrode structures are fabricated before the molecule positioning in our unique approach, molecules are positioned (e.g., by the SAM technique, chemistry, surface chemistry, bio-recognition, hybridization, electric fields, and/or steric constraints) without damage.

For electrical/dielectric sensor, electrical sensor, general chemical sensor, nano-chemical reactor, or electrical and electrochemical biosensor applications, for traditional electrical dielectric behavior, and for electrical functions such as diode and switch applications, a variety of chemical and molecular modifications can be made to the device. To increase sensitivity or enable certain electrical measurements, the surface of the top and bottom electrodes may require modification. This includes chemical and molecular attachment via electro-less- or electro-plating, covalent bonding, chemical and physical adsorbtion and absorbtion, van der Walls interaction, ionic bonding, hydrogen bonding, or combinations thereof. For example, the specific reaction of the thiol group with gold contacts enables surface passivation with a self-assembling molecule system as well as attachment and immobilization of specific molecules like antibodies, nucleic acids, proteins and enzymes. Not only the presence, but also the interactions, structures, chemistries, reaction and byproducts, electrical signatures of the immobilized and or transported molecules and atoms can be interrogated with the structure of this invention. Their interactions can be used to monitor electrochemical, chemical and biological interactions such as nucleic acid hybridization, protein-protein interaction, chemical reactivity etc. In the specific case of detecting DNA hybridization, strands of DNA can be immobilized within the device (in a variety of possible configurations such as bridging between electrodes, on one electrode, or on both electrodes but not contacting each other). In this situation, when non-immobilized strands interact with those immobilized, electrical differences are present and able to be detected. Such detection may be due, for example, to hybridization or due to a free strand of analyte or a fuctionalized nano-particle bridging positioned strands. In general in sensor applications, the chemical and physical status of interactions taking place in the device can be modified and controlled by chemical or physical modifications to the system caused by the introduction of the species to be detected. The species to be detected can cause reaction product production, steric and chemical binding, bonding, bridging, or the cutting of molecules attached to or between electrodes, excluding of species within the gap, and specific changes in surface layer or SAM properties. These changes can then be measured by electric/dielectric, electrochemical, and/or other means of detection such optical (e.g., photoluminescence or fluorescence).

The critical aspects of our invention lie in the use of fine thickness controllable sacrificial layers for channel and gap height control, lithography process such as photo-, e-beam-, or soft lithography, as required, for lateral dimensions, electro-less plating, electro-plating or chemical attachment when needed for fine gap spacing adjustment or gap material property variation, and flow positioning ability. This invention allows such positioning/contacting gap (pore) sites to be included, when desired, in a nano- and/or microfluidic flow structure.

FIG. 1 shows an example fabrication process flow of a nano-scale, molecule positioning/contacting gap structure incorporated into a microfluidic, nanofluidic, or combined channel structure. In the demonstration now discussed in detail, the more demanding case of two feature size scales due to the presence of microfluidic channel structures, is addressed. In all cases, a precision sacrificial material is always used for the molecular (i.e., nano) scale positioning/contacting gap region of this invention and it may also be used as the first sacrificial layer material discussed below when all features are of the nano-scale. The general attributes distinguishing the precision sacrificial layer of our invention are listed in Table I.

TABLE I

Some Distinguishing Features of the Precision Sacrificial Layer Material Attributes Must be capable of accurate thickness monitoring during formation down to thickness of at least 20 nm down to 1 nm
Must form with a smooth surface with characteristic feature sizes small compared to the sacrificial layer thickness
Can not substantially alloy or chemically react with other channel or gap materials
Must have a specific etchant or dissolution chemical or process which removes the layer selectively with respect to other channel and gap materials
Must have an etch or dissolution rate compatible with high through put manufacturing
Must withstand any elevated temperatures or adverse chemical environments experienced during subsequent process in which it is still present In the demonstration of FIG. 1, there are two sacrificial layers used. These are a high surface to volume material (for example, column-void Si) for the relatively large volumes of the micro-scale features and a precision sacrificial layer for the relatively minute volumes of the nanometer scale features. Whichever specific material is chosen for the nanometer scale sacrificial layer, it must, most importantly, be a material whose thickness is readily controlled during formation. The fabrication processes of the demonstration outlined in FIG.1 use low processing temperatures and, therefore, they allow using any type of substrate such as semiconductors, glasses, plastics, polymers, metals, ceramics, insulators, organic materials, inorganic materials, and any combinations thereof. If a conducting substrate is used, care must be taken to avoid electrical ac or dc coupling of gap electrodes and their interconnects to such a substrate.

In demonstrations of FIG. 1, both glass and Si wafer substrates have been used. Processes in FIG. 1a and 1b can be avoided, if desired. The substrate may be physically modified and can contribute to form any micro-scale channels required during the sacrificial layer removing process.

We now discuss in some detail a specific demonstration using a glass substrate. This glass was first cleaned with acetone, isopropyl alcohol, and DI water before processing. An electron cyclotron resonance plasma enhanced chemical vapor deposition (ECR-PECVD) tool deposited the first structural layer. When the substrate is conducting, this layer or the base layer (see FIG. 1) must be an organic insulator or inorganic insulator such as silicon oxide and silicon nitride. For the specific demonstration under discussion, the first structural layer was silicon oxide. The structural layer was patterned and dry etched for the following lift-off process, which used a high surface to volume ratio material (e.g. our column/void network film) to fill the etched area as seen in FIG. 1b. This area is to become the micro-scale features (used for this demonstration) of a fluid channel. Such micro-scale may be used to bring fluids to and away from the nano-scale gap or pore region. A high surface to volume sacrificial material may be used for these micro-feature size regions due to its ease and speed of removal for features of this scale. The channel region of FIG. 1 could also be formed by other processes such as photon lithography, e-beam lithography, laser ablation, embossing, physical machining, physical scribing etc., in the case where micron scale channel features are desired. The previously mentioned ECR-PECVD tool was also used for the column/void network sacrificial film deposition of this demonstration, and the thickness of the film is selected to determine the depth of the micro-scale deep channel area. Acetone coupled with mechanical agitation (e.g., ultra sonic agitation) was used for the lift-off process, and the lift-off process provided a very flat surface by removing the column/void network film that was deposited in the unwanted areas. The use of high surface to volume ratio sacrificial material can be replaced by other deposited, sacrificial layer materials such as the metal films described below. This may be done, for example, if nanometer scale, not micrometer scale, features are desired in the region seen in FIG. 1b Next, what we term the base layer in FIG. 1 was deposited and this was done using ECR-PECVD in this demonstration. While silicon oxide was used for the base layer in this demonstration, polymers, ceramics, silicon nitride, semiconductors, and the other dielectric materials can replace it. Next, the bottom electrode was formed by lithography, electrode material deposition, and lift-off processes. The lift-off process at this step of fine feature creation can result in unwanted triangular high peak like structures at the edges of the electrode structure, if using a metal film sacrificial layer, because of a ductile characteristic of metals. This unwanted peak structure can cause device shorting by forming asperities and reducing intended gap space. This problem can be overcome by over-developing the resist coupled with a chlorobenzene soak in the lithography process. The chlorobenzene soak between the resist soft bake and UV exposure modifies the surface of the resist, hardening the surface. This provides stronger cross-linking at the surface of the resist. The differences in cross-linking strength between the bulk of the resist and its surface result in different dissolving rates in the developing process. Consequently, at the edges, defining where the bottom electrode will be, the surface is removed more slowly creating a ledge structure. Similar resist structures for effective lift-off can be accomplished using layered resists. This works very well when e-beam lithography is used. In any case a ledge structure can lead to shadows at the edge area during the subsequent deposition process. The shadowing effects cause an advantageous step discontinuity in the film which provides clean edge structures after the subsequent lift-off.

Any metals (e.g. gold, silver, platinum, etc.), semi-metals, and doped or intrinsic semiconductors (e.g. silicon, carbon, germanium, or mixtures) can be used for the electrodes of the nano-scale gap structure. The electrode material must be chosen for its use in he follow on chemistries and electro-chemistries, such as self assembled monolayer reactions, reaction catalysis, and electrochemical reactivity. If SAMs are to be used to position molecules, the electrode material does not need to support self-assembly at this point, if subsequent electroplating is to be used prior to SAM introduction. A variety of SAM reactions can occur on the electrode material. Common SAM reaction systems include thiolated molecules on gold, copper platinum and silver, etc., and silicon esters, ethers, and halogenated silanes on oxide surfaces. For this demonstration, electroplating was not used, and gold was used as electrode material. A 100 Å of Cr layer was deposited before Au deposition, and the Cr layer was used to enhance adhesion between gold and silicon oxide. Other adhesion promoters could be used, as desired. The second structural layer in FIG. 1 was deposited using ECR-PECVD in this demonstration. Lithography and the second structural layer etching process were performed to define the region for the next lift-off process. The fine thickness-control sacrificial layer was then formed over the second structure layer (where it will be lifted off) and over the channel and gap regions. In this demonstration, the fine thickness-control sacrificial material (aluminum or nickel were used) was deposited using thermal evaporation. The fine thickness-control film can be deposited by any of a number of physical or chemical material formation methods such as molecular beam epitaxy (MBE), physical vapor deposition, chemical vapor deposition, metal-organic chemical vapor deposition (MOCVD), jet vapor deposition (JVD), spin-on, nebulizing, sputtering, and evaporation, but the key aspect of this formation is that the thickness of this precision sacrificial layer must be carefully controlled. The material must have the attributes of Table I and may cosist of semiconductors, glasses, plastics, polymers, metals, ceramics, insulators, organic materials, inorganic materials, and any combinations thereof. Acetone coupled with ultra-sonic agitation was used for a lift-off process after this precision sacrificial layer formation. In this example, physical deposition of Al,Ni or Cr was used and thickness was controlled using a deposition monitor. Next, an ECR-PECVD deposited insulator layer (silicon nitride in this demonstration) was deposited, and another set of processes including lithography, insulator layer etching was followed to form the top electrode region. The materials that were mentioned above for the bottom electrode can also be used for the top electrode. In this demonstration, gold was also used as a top electrode material. In this demonstration electrode deposition also formed the interconnects to the gap electrodes. At this point, the molecular scale device of this invention has the following features: the top and bottom electrode structures and their interconnects are separated by an insulator layer through all of the device areas except at what will become the molecular scale positioning/contacting gap (pore) area. In this area, the two electrodes are directly contacting the fine thickness controllable sacrificial layer (Ni or Al were used in this demonstration), which is still in place. The next step is to remove this thickness-control sacrificial layer thereby creating a nano-scale molecule positioning/contacting gap area after the sacrificial layer removal. The thickness of the fine sacrificial layer establishes the structure spacing the nano-(molecular) scale positioning/contacting gap (which can be as small as 1 nm) by its material removal. This starting spacing, as well as starting electrode material, can be then modified at each gap site by subsequent chemical reaction, electro-less or electrochemical plating (i.e., deposition) or molecular (SAM) positioning, as desired. FIG. 1b~FIG. 1h show the details of a typical process flow up to this point of the starting spacing.

A capping layer was next deposited using ECR-PECVD, and silicon oxide was used for this demonstration. Other materials used included silicon nitride, BCB, and paralyne C. The capping layer may consist of semiconductors, glasses, plastics, polymers, metals, ceramics, insulators, organic materials, inorganic materials, and any combinations thereof. A magnetically enhanced reactive ion etching tool was used to form through-holes for removal of the first sacrificial (column-void network Si, in this demonstration) and fine thickness-control second sacrificial (Ni or Al, in this demonstration) layer materials. These sacrificial layers (the column/void network film and the precision sacrificial film) were then removed by a following wet etching processes. Other possible removal techniques include dry etching, photo decomposition, or sublimation. For this step a 5% tetra methyl ammonium hydroxide (TMAH) solution at 75° C. was used for wet etching away both the Al and column/void network sacrificial layers, when Al was used as the precision sacrificial material. When Ni was used for the precision sacrificial material, ferric chloride or "TFB type Ni etchant", a product of Transene, was heated to 50C. for the etching. The latter etchant in particular provided excellent chemical specificity and etch rate. The high surface to volume ratio material used for the first sacrificial layer offers the advantage of relatively fast removal in this step where relatively large volumes are involved and the fine thickness-control material offers the advantage of finely controlled removal in this precision step where relatively very small volumes are involved. If only nano-scale features are involved in the whole structure, then obviously the fine thickness-control material can be used for both sacrificial layers. ECR-PECVD deposited silicon oxide was then used to seal the through-holes after the etching of the sacrificial layers. As noted, to further precisely control the gap spacing or composition, subsequent chemical reaction, electro-less or electrochemical plating (i.e., deposition) or molecular (SAM) positioning; as desired, can be done at this point. For example, at this point an electroplating solution, can be put into the gap (or various gaps, in an array) via the fluid flow channels and electroplating undertaken by electrode biasing. Such electroplating may also be used to very precisely control the electrode spacing of FIG. 1i. By sequential flow of plating solution and biasing of various electrodes or both, different sets of electrodes in an array of positioning/contacting gaps can have different spacing, different composition, or both.

By sequential flow of various molecules, different molecules can be positioned/contacted at the different sets of pore electrodes in an array. Positioning/contacting may be accomplished using chemical (e.g., SAMs), electric field and/or steric means. As a specific example, DNA or other molecules can then be immobilized at this point at the nanometer scale positioning/contacting gap (pore) structures and a SAM approach can be used to accomplish this. These molecules are then moved into the position by fluidic flow in the channels and proper sequential flows can put different molecules at different electrode gap sites. FIG. 2 shows an example demonstration of an actual molecular scale device with the nano-scale positioning/contacting gap of this invention integrated into a nano-fluidic structure.

Another fabrication approach demonstrating our invention is shown in FIG. 3. Any types of substrates such as plastics, metal foils, and ceramics, also can be used for this approach as in the previous demonstration.

In the case of this example process flow, the nano-channel structure was fabricated first, but the combination of the nano- and micro-channel regions or the presence or absence of one or the other, can be changed if it is desired. However, it is recommended to stack channels forming the smallest gap size first, as in this example, since that can allow the removal of the micro-scale region sacrificial layer to give access to the precision nano-scale sacrificial layer. Again in this demonstration, electrodes are formed in the pore structure. It is clear in all these demonstrations that electrodes need not be formed in the pore regions if, for example, one is only interested in creating a sorting structure. However, even in simple sorting structures the presence of electrodes can be very useful since the aforementioned approaches to gap spacing adjustment allow precise adjustment of sorting spacing. Our invention uniquely gives the opportunity for precision electrode formation in the pores but does not require it.

For the first electrode structure of FIG. 3, this demonstration again used a lift-off process. A pattern having opposite tone was used in the lithography process because a resulting pattern after the lift-off process would be reverse from the original pattern. A material for the first electrode was deposited after the lithography process, and chemicals that can dissolve the photoresist removed the layer deposited on the photoresist. A thermally evaporated gold film was chosen for the first and second electrode material in this example because it is needed for the following SAM process. The first sacrificial layer was also formed using the same technique (lift-off) used for the first electrode formation, and nickel was used as this precision sacrificial layer for this example. The second gold electrode was also formed by the lift-off process. After the three metal layer depositions, the first capping layer, silicon oxide, was deposited. Through-holes that would be used for the precision sacrificial layer removal were patterned and etched. The second sacrificial layer was deposited, and a photoresist having 3 μm in thickness was used in this demonstration for this sacrificial layer. The second capping layer was deposited after the sacrificial layer deposition, and a polymer file, parylene C, was used in this example. The second through-hole set was patterned and etched. The chemical removing agent (acetone) for the second sacrificial layer was used first, and the structure was rinsed in DI water after the removal process. The second channel was dried after the rinse process, and then the removal agent for the precision sacrificial layer removal was introduced through the micro-scale channels. The structure was rinsed in DI water and dried in vacuum environment after the precision sacrificial layer removal.

FIG. 4 shows FESEM side view pictures for (a) 30 nm nano-channel structure and for (b) 2.7 μm micro-channel structure. These dimensions refer to the channel heights. The nano-channel region can then function as the gap or molecular pore structure while the micro-channel provides access to this gap region. As seen, in this structure the gap region has built-in electrodes. A top view showing both the micro- and nano-scale structures is seen in FIG. 5.

FIG. 6 shows the result of using our invention in the case where e-beam lithography has been used to define the lateral dimension of the nano-channel. This figure shows five parallel 20 nm by 20 nm (cross-section) channels which we fabricated. These may be utilized as has been described herein in electroded or non-electroded gap or pore structures.

Figure 7:
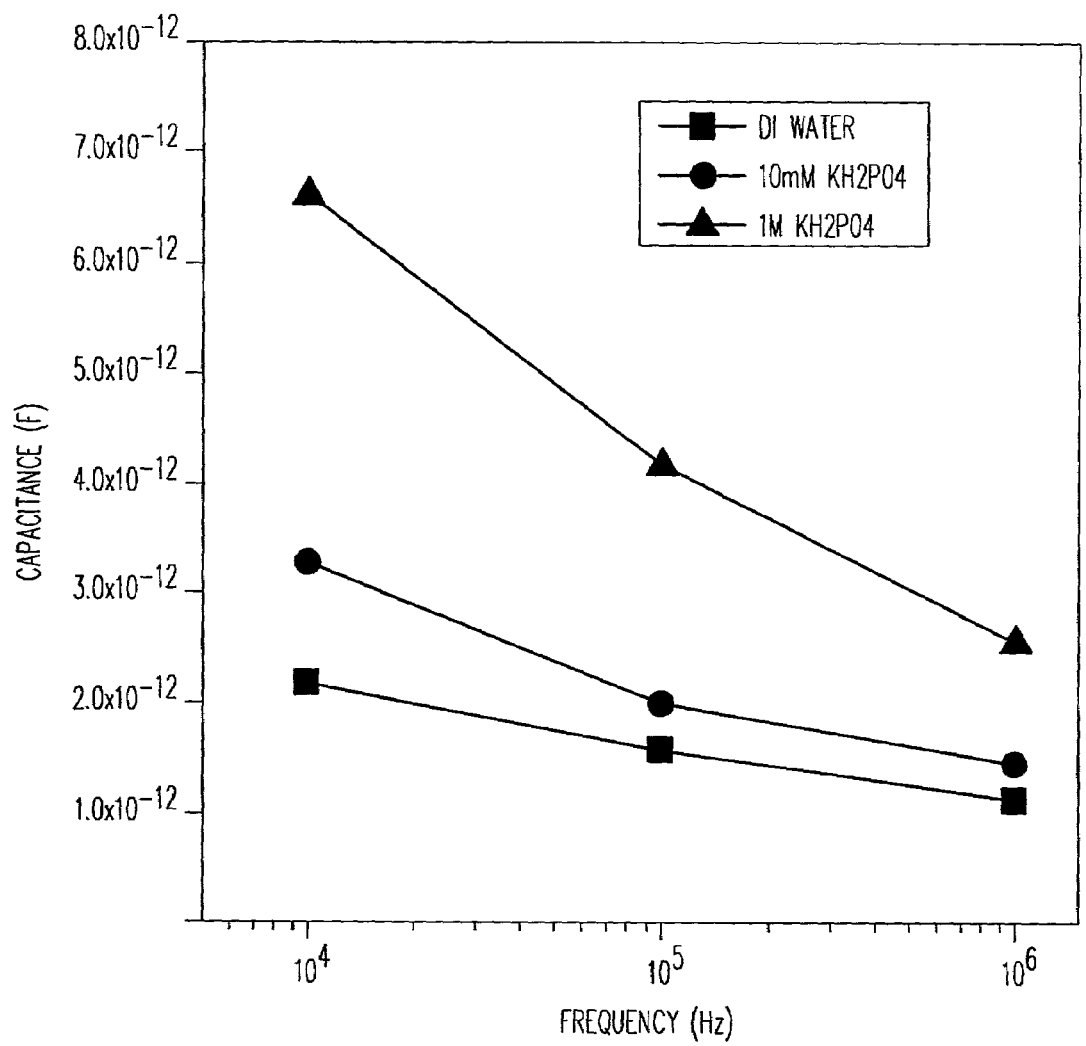
FIG. 7 is a graph of the capacitance for a device of the invention having a nano-gap with bare gold electrodes in various solutions over various frequencies.
Figure 8:
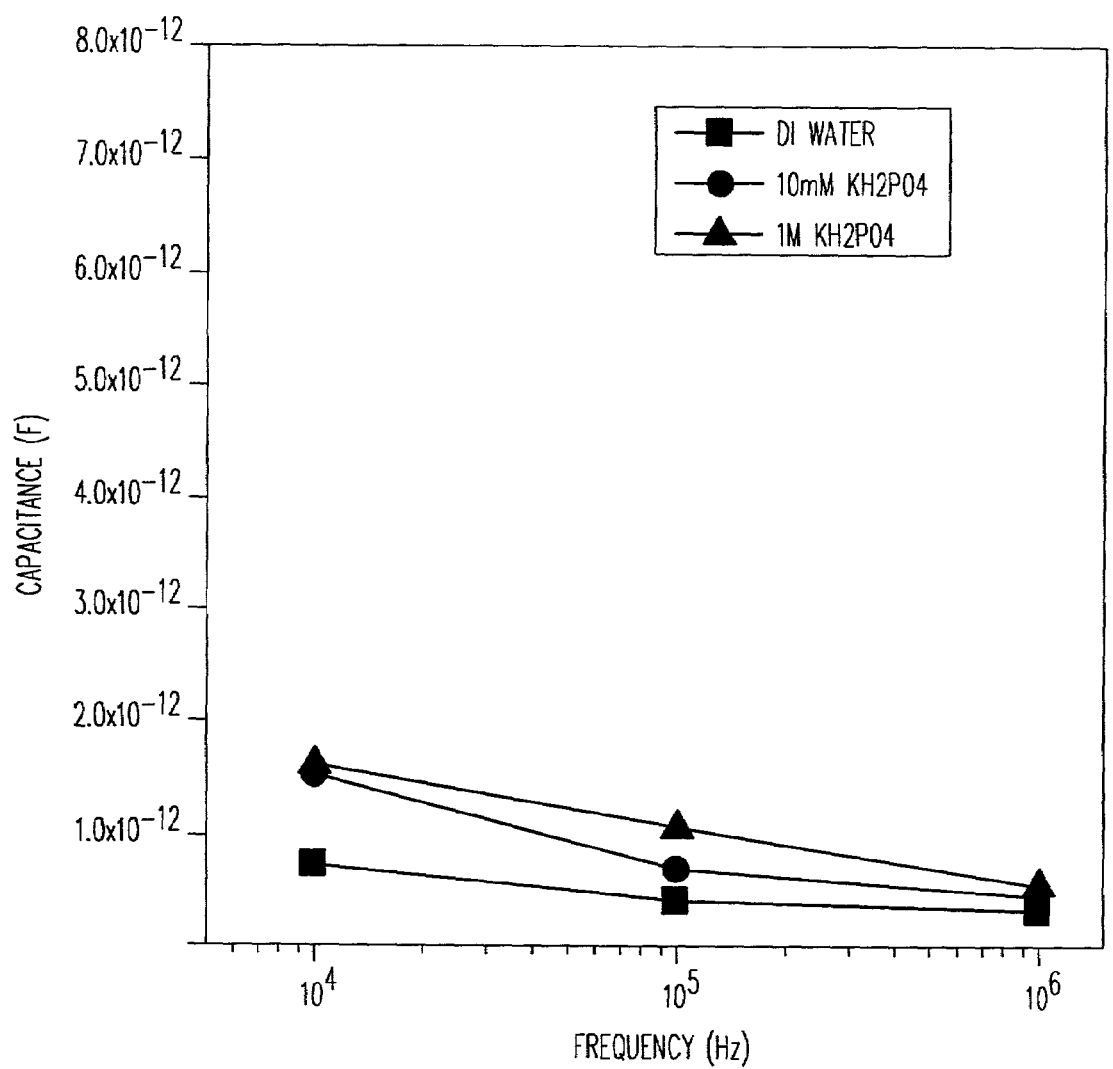
FIG. 8 is a graph of the capacitance for a device of the invention having the same nano-gap as the device of FIG. 7 after C18 positioning and monolayer formation on the gold electrodes.

FIGS. 7 and 8 show actual electrical data obtained for a nano-gap structure such as that shown in FIG. 4a. These particular data give capacitance as a function of frequency. The data of FIG. 7 show the functioning electroded gap structure and the data of FIG. 8 demonstrate the ability to move SAMs to a gap structure and to attach such SAMs to the electrode materials. The data of FIG. 8 are for the same gap as that of FIG. 7 but were obtained after SAM positioning.

This invention describes the fabrication of molecular scale pore structures for applications such as sorters, filters, molecular transistors, sensors, and "molecular readers". In the latter application, electrodes in the pore have a molecular scale spacing allowing the direct "reading" of charge location, and therefore structure, of a molecule as it passes through the pore. Our approach to all of these pore applications do not involve the creation of a hole and then its subsequent shaping into a molecular-scale sized pore, as is done in other approaches to pore fabrication. Instead our approach uses nano- or micro-scale surface machining techniques such as a (1) sacrificial layer films and (2) deposited high surface area to volume ratio film materials to create pores. The fabrication of deposited films with nanoscale void regions is delineated in discussions on the nanoscale columnar/void material developed by Fonash et al. incorporated herein by way of reference.

An example of an actual nanopore structure fabricated with the sacrificial layer approach is seen in FIG. 9. Using our approaches nanoscale pores may be fabricated with sizes ranging from 1–100 nm and these pores may be combined with micro or nanofluidic array structures as also demonstrated in FIG. 9. These structures are approximately the same size as many small chemicals and biological molecules such as proteins, pep tides, anti-bodies, enzymes, drugs, and nucleic acids and the may be used to manipulate, sense, or both, molecules individually or in small numbers. For instance nucleic acids or proteins may be moved through the gap and the sequence of bases or amino acids can be read in individual strands by monitoring the ion current through the pore or interrogating the electrical properties of the gap. The nanopore may also have electrodes in situ, as is the case in the demonstration of FIG. 9, that can be physically or chemically tailored to make the pore area selective for certain atoms or molecules, similar to selective pores in biological membranes, such ion pores, nuclear pores or endoplasmic recticulum bound ribosomal groups, etc. The tailoring of the pore environment can be accomplished using a number techniques, such as, but not limited to: electroplating or electrode-less plating material in the pore to define its size, functionalizing the surface with thiol monolayers, silanized monolayers, alkenization, antibody attachment, ligand attachment, nucleic acid attachment controlling the hydrophobicity and hydrophilicity, and defining the chemical moieties of the surface. Flow through the pore can be controlled by pressure, or electrokinetically, through the use of electrophoresis and electroosmosis. Molecules can be aligned in the pores in structures such as FIG. 9, which incorporate electrodes. In addition, the use of nanoscale particles in the pore may enhance the flow properties or increase the sensitivity of electrical detection by modulating the electrical properties of the pore.

Another method of molecular scale pore formation utilizes deposited, nanoscale, high surface area to volume ratio films to define pore size and position. These films can be deposited at low temperature, on a variety of inexpensive materials, such as glass, plastic, ceramics and metals foils, or any substrates including semiconductors, glasses, plastics, polymers, metals, ceramics, insulators, organic materials, inorganic materials, and any combinations thereof In this approach to flow through pores, the molecules are forced to flow through the array of pores seen in the material shown in FIG. 2. In example configurations, this array can be located across a channel while in another the array can be, for example, down the middle of a channel controlling species passage from one side of the channel to the other. The deposition methods producing these pore array films include but are not limited to, ECR-PECVD, PVD, PEPVD, CVD, chemical bath deposition, and spin-on materials. The high surface area to volume ratio films can be made of semiconductors, insulators, conductors, metals or polymers. The film thickness and space between features seen in FIG. 2, for example, define the pore size, Hence the pore size is controllable with the use of deposition parameters control. The overall size of the array of pores can be defined by the area of the film which is determined using lithography, laser ablation, physical scribing or other methods of patterning. The pore size, shape and surface/bulk chemistry of the pores may be modified, during deposition by varying the process parameters, or post deposition by chemical or physical modifications, which include but are not limited to, ion milling, wet etching, laser ablation, plasma chemistry, implantation, silicidation, silanization, alkenation, chemical functionalization, thermal oxidation and annealing. In a specific embodiment of this device the high surface area to volume ratio film is a deposited, low temperature continuous columnar/void Si film, deposited by ECR-PECVD. This nanoporous film can be integrated into micro or nanofluidics devices/arrays and coupled to microelectronics using standard lithographic and microfabrication patterning techniques. By varying the deposition parameters, of microwave power, process pressure and reactant gasses, the pore size can be varied from sub nanometer to 20 nm. Pore chemistry such as surface energy, wettability, and chemical moieties can also be defined during deposition by varying the same parameters. As detailed above the chemical and physical properties of the pores can be modified, post deposition by a variety methods. The devices may be fabricated in nanometer or micrometer thick layers and capped with continuous, non-porous deposited thin films or by macroscale bonding to glass, semiconductors, plastics, ceramics or metals. These devices may be fabricated in layers with the nanoporous material stacked between non-porous, deposited material making multiple layers of pores. Once deposited in devices and enclosed these materials may act as filtration devices, separation devices, may mimic selective pores of biological membranes or act as extremely sensitive ionic flow sensors. Flow through the pore can be controlled electrokinetically.

These approaches to nanopore formation offer distinct advantages over traditional methods of ion bombardment in yield, ease of fabrication and cost, and in their ability to be fabricated in cheap substrates such as glass, plastic, ceramic or metal foils.

While the invention has been particularly shown and described with reference to preferred embodiments thereof, it will be understood by those skilled in the art that various alterations in form and detail may be made therein without departing from the spirit and scope of the invention. In particular, the columnar material, while preferably silicon, can be any material that is capable of being deposited in a porous columanar manner. Also, the properties of the porous material can be varied greatly so that many different sizes and types of molecules can be manipulated or sensed.

A further application of the present invention is directed to the design and fabrication of nano and microfluidic valves using molecules. More specifically, the use of polar, inducibly polar or liquid crystal molecules. Liquid crystals are molecules that form a semi-crystal state when exposed to favorable environmental conditions such as temperature changes, pH changes, magnetic fields and electric fields. Liquid crystals form this semi-crystal by aligning in along a single common axis called the director (c.f., FIG. 11). Liquid crystal formation can be controlled and localized in devices by controlling the local environment through the use of nano or microscale heaters, electrodes, magnets, chemical injectors, electron beams, and photons or localized chemistry and morphological changes such as self assembled molecule layers or high surface to volume ratio films. When aligned along the director and perpendicular to the flow through in a nano or microfluidic device these molecules will impede flow through these areas creating a valve (c.f., FIG. 12). A large number of liquid crystal molecules exist such as polymer, polymer dispersed, polymer stabilized, lyotropic and ferroelectric liquid crystals, with a wide variety of properties and responses to environmental stimulus.

As a specific embodiment of this device, a nanoscale, water based, electrically controlled valve for use in nano or microfluidic systems is presented (c.f., FIG. 13). Water molecules, which have a strong permanent dipole will align very regularly in an electric field and will display short-range order on the nanometer scale, with a semi-crystalline ice-like state. In very confined geometries such as a nanogap sensor or a molecular scale pore, these oriented water molecules will act as a valve, which can be controlled by the application of an electric field between two electrodes.

A further application of this invention is its use as a catalytic chemical and/or biochemical reactor and sensor. The electrode materials may be tailored for their catalytic properties. For example, Platinum may be used to catalyze NOx conversion to CO or CO2 in the presence of a carbon source. Another example utilizes an osmium containing electrode polymer that catalyzes hydrogen peroxide into water at low reduction potentials in the presence of peroxidase.

Although the present invention describes in detail certain embodiments, it is understood that variations and modifications exist known to those skilled in the art that are within the invention. Accordingly, the present invention is intended to encompass all such alternatives, modifications and variations that are within the scope of the invention as set forth in the following claims.

What is claimed is:

1. A method for producing a fluidic device, the method comprising: patterning a first structural material on a substrate; removing regions of said first structural material to produce a first patterned structural layer; depositing first sacrificial material onto regions of said substrate where first structural material has been removed, producing a first sacrificial layer; patterning; depositing electrode material onto the surface of first structural material of said first patterned structural layer to produce a first electrode; patterning; depositing second sacrificial material to produce a second sacrificial layer on said first electrode and regions of said first sacrificial layer on said first patterned structural layer; depositing cap of channel material to produce a channel cap layer; depositing capping material onto said channel cap layer to produce a capping layer; removing said first sacrificial layer and said second sacrificial layer to produce a device having a gap region resulting from the removal of the portion of said second sacrificial layer between said cap of channel material and said first electrode and a fluid control channel continuous with said gap region resulting from the removal of the remaining portion of said second sacrificial layer and said first sacrificial layer.

2. The method of claim 1, further comprising the steps of: patterning said channel cap layer to produce a patterned channel cap layer; and depositing electrode material in the region where channel cap material of said channel cap layer has been removed by patterning to produce a second electrode.

3. The method of claim 1, further comprising the step of etching at least one hole thorough said capping layer and said channel cap layer.

4. The method of claim 2, further comprising the step of etching at least one hole through said capping layer and said channel cap layer.

5. The method of claim 1, wherein said substrate is selected from the group consisting of, glasses, plastics, polymers, metals, ceramics, and any combinations thereof.

6. The method of claim 1, wherein said patterning is selected from the group consisting of photon lithography, e-beam lithography laser ablation, embossing, physical scribing and any combinations thereof.

7. The method of claim 1, wherein said patterning is by optical lithography.

8. The method of claim 1, wherein said first structural material is silicon.

9. The method of claim 1, wherein said first structural material is selected from the group consisting of silicon oxide, silicon nitride, and any combinations thereof.

10. The method of claim 1, wherein said first electrode material is selected from the group consisting of metals, semi-metals, conductive semiconductors, and any combinations thereof.

11. The method of claim 1, wherein said first sacrificial material is selected from the group consisting of high surface to volume ratio column-void silicon, high surface to volume ratio deposited films, and any combinations thereof.

12. The method of claim 1, wherein said cap of channel material is selected from the group consisting of silicon nitride, silicon oxide, and any combinations thereof.

13. The method of claim 1, wherein said capping material is selected from the group consisting of glasses, plastics, polymers, metals, ceramics, and any combinations thereof.

14. The method of claim 1, wherein said device is nano-scale, micro-scale, or nano-scale and micro-scale.

15. The method of claim 1, wherein said gap region is nano-scale.

16. The method of claim 1, further comprising the step of physically or chemically modifying said first electrode.

17. The method of claim 16, wherein said first electrode is modified by electroplating.

18. The method of claim 1, further comprising the step of providing molecules to said gap region of said device.

19. The method of claim 18, wherein said molecules are provided by fluidic flow through said fluid control channel.

20. The method of claim 18, wherein said molecules are positioned or contacted by chemical, steric, electrical, or any combination of means thereof.

21. The method of claim 18, wherein said molecules are provided as a self-assembling monolayer or self-assembling monolayers.

22. The method of claim 1, wherein said second sacrificial material is selected from the group consisting of aluminum, nickel, and any combinations thereof.

23. The method of claim 18, wherein said molecules are selected from the group consisting of liquid crystals, polymers, proteins, nucleic acids, and any combinations thereof.

24. The method of claim 1, wherein said first sacrificial material, said first electrode, said second sacrificial material, said cap of channel material, and said capping material are deposited by physical vapor deposition, chemical vapor deposition, liquid deposition, molecular beam epitaxy, plasma assisted chemical vapor deposition, sol-gels, nebulization, spraying, electroplating, tape casting, spin coating, assembly from liquid chemical precursors, self assembly and any combinations thereof.

25. The method of claim 1, wherein said gap region is physically or chemically modified by at least one process selected from the group of ion milling, wet etching, laser ablation, plasma chemistry, implantation, silicidation, silanization, alkenation, chemical functionalization, thermal oxidation, and annealing.

26. The method of claim 1, wherein said first sacrificial material has higher etching selectivity in comparison to said first electrode material, said second sacrificial material, said cap of channel material and said capping material.

27. A fluidic device produced by the method of claim 1.

28. The method of claim 1, wherein said substrate is selected from the group consisting of semiconductors and insulators.

29. The method of claim 1, wherein said capping material is selected from the group consisting of silicon oxide and silicon nitride.

30. The method of claim 1, wherein said capping material is selected from the group consisting of semiconductors and insulators.

* * * * *

UNITED STATES PATENT AND TRADEMARK OFFICE
CERTIFICATE OF CORRECTION

| | | |
|---|---|---|
| PATENT NO. | : 7,052,616 B2 | Page 1 of 1 |
| APPLICATION NO. | : 10/219955 | |
| DATED | : May 30, 2006 | |
| INVENTOR(S) | : Stephen J. Fonash et al. | |

It is certified that error appears in the above-identified patent and that said Letters Patent is hereby corrected as shown below:

In Column 1, line 9, after the Cross-Reference to Related Applications, and before the Background of the Invention, add:

--STATEMENT REGARDING FEDERALLY SPONSORED RESEARCH OR DEVELOPMENT
This invention was made with support from the Government under DARPA/Air Force Contract No. F33615-98-1-5164. The Government has certain rights in the invention. --

In column 16, line 19 (Claim 3), "thorough" should read -- through --

Signed and Sealed this

Second Day of January, 2007

JON W. DUDAS
*Director of the United States Patent and Trademark Office*